No. 651,162. Patented June 5, 1900.
R. DIETRICH.
SPRAYING DEVICE FOR USE IN MANUFACTURING PAPER.
(Application filed Nov. 24, 1899.)
(No Model.)
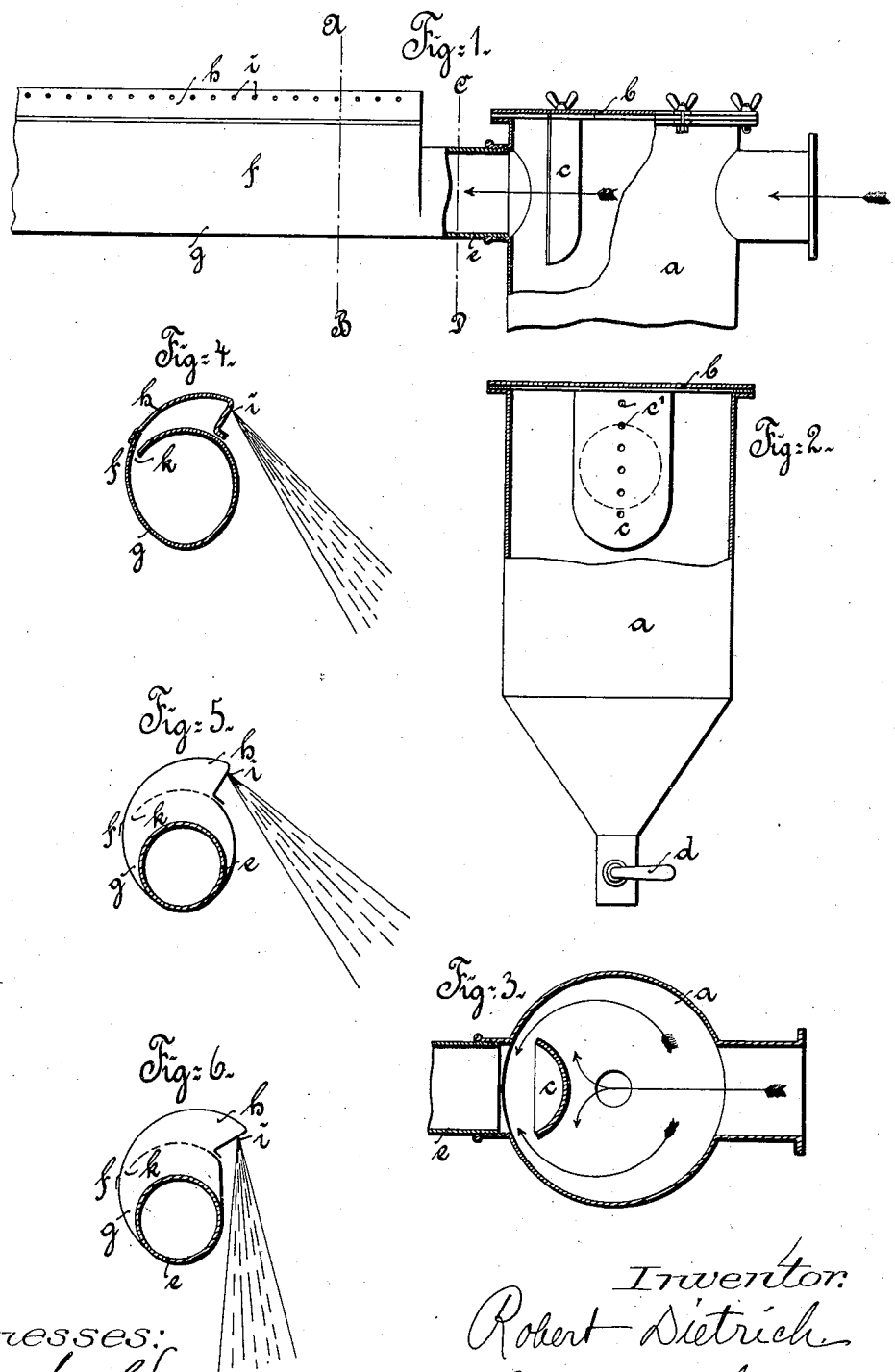
Witnesses:
P. F. Nagle.
M. G. Lukens.
Inventor:
Robert Dietrich
By Wiedersheim & Fairbanks
Attorneys

UNITED STATES PATENT OFFICE.

ROBERT DIETRICH, OF MERSEBURG, GERMANY.

SPRAYING DEVICE FOR USE IN MANUFACTURING PAPER.

SPECIFICATION forming part of Letters Patent No. 651,162, dated June 5, 1900.

Application filed November 24, 1899. Serial No. 738,134. (No model.)

*To all whom it may concern:*

Be it known that I, ROBERT DIETRICH, paper manufacturer, a subject of the Emperor of Germany, residing at 5 Mühlberg, Merseburg, in the Empire of Germany, have invented certain new and useful Improvements in and Relating to Spraying Devices for Use in Connection with Apparatus for the Manufacture of Paper and the Like, of which the following is a specification.

This invention relates to a jet-tube arrangement or spraying device for use in connection with apparatus for the manufacture of paper, cellulose, and the like; and it has for its object the prevention of obstructions in the water-outlet holes, so as to maintain a uniform action.

It is of particular importance in the regular working of rotary knot-catchers that the water-jet tube disposed above the drum of the knot-catcher should always uniformly moisten the entire surface of the drum, and consequently that the holes in the jet-tube should not become stopped by impurities. Although various means have heretofore been proposed for this purpose, they have not proved completely successful, owing to the fact that they are not based upon the principle of preventing the impurities from reaching the jet-holes. To effectually prevent the impurities from choking or stopping the jet-holes, I propose to provide the said holes at the upper portion of the tube, and for this purpose the tube is formed of such a cross-section that, notwithstanding the issue of water at the highest portion, it permits the free ejection of water-jets over the entire surface of the knot-catcher. Although in this manner great safety from the stoppage of the jet-holes is obtained, it is now proposed to render such stoppage practically impossible by the use of a sand and mud trap connected to the jet-tube for filtering the water previously to its entrance into the jet-tube.

The accompanying drawings show a jet-tube arrangement constructed in accordance with this invention.

Figure 1 is an elevation, partly in section, of a portion of the jet-tube provided with the sand and mud trap. Fig. 2 is an elevation, partly in section, of the sand and mud trap, shown separately, taken at right angles to Fig. 1. Fig. 3 is a horizontal section of the sand and mud trap. Fig. 4 is a cross-section of the jet-tube, taken on the line A B of Fig. 1. Fig. 5 is a similar section taken on the line C D of Fig. 1, and Fig. 6 is a similar section showing a slightly-modified form of jet-tube.

The sand and mud trap shown in Figs. 1 and 2 consists of a cylindrical vessel $a$, formed with a lower tapering portion and provided with inlet and outlet branches or sockets and with a removable cover $b$ at the top, preferably fixed in place by means of screw-bolts attached by eyes to the under side of the flange of the vessel $a$, such bolts being capable of swinging on their pivots. In the interior of the sand and mud trap $a$ and close against the outlet-opening is arranged a deflector-plate $c$, the latter being curved and provided at the middle with a number of small holes $c'$. The water is caused to pass around the deflector-plate before it can pass through the two narrow passages leading to the outlet-socket. As the current of water strikes the deflector-plate it is uniformly divided, and owing to the diffusion of the current in the wider part of the vessel the particles of sand and mud are permitted to separate out from the current and then drop into the lower portion of the vessel $a$, from which they are removed from time to time through a discharge-cock $d$ or the like. The water thus purified then passes through the outlet branch or socket $e$ into the jet-tube $f$.

The jet-tube is double-chambered in cross-section and consists of a lower tube $g$ of circular, elliptical, semi-elliptical, egg-shaped, or other convenient section and of a cap $h$, surmounting the tube proper. This lower tube $g$ communicates with the cap by a narrow opening or slot $k$, specially provided for this purpose. The cap is narrowest at the opening or slot and is provided at its overhanging front end with holes $i$, disposed at an angle with the slot and delivering the water-jets at a suitable angle to the drum. (See Fig. 4.) The combination, as well as the special form of the jet-tube, may be varied in many ways without altering the nature of the invention. Thus, for example, the front portion of the cap may be caused to project so far forward, and at the same time the jet-tube flattened at the side, as to permit of the water-jets issuing in an almost vertical direction, as shown in Fig. 6.

It will readily be seen that the water passing through the sand-trap and entering the jet-tubes will deposit at the bottom of the said tube any impurities it may have carried with it, and this is further facilitated by giving such tube an egg-shaped cross-section, Fig. 4. Moreover, it is clear from the position of the slot k with regard to the spraying-holes i that it is almost impossible for suspended substances in the water to enter the outlet portion of the spraying-tube. Thus the object of the arrangement is effected by the improved jet-tube in the most perfect manner.

What I claim is—

1. A jet-tube arrangement or spraying device for rotary knot-catchers, felt-washers, &c., for use in the manufacture of paper, wood fiber and cellulose, characterized by a jet-tube having a divided cross-section consisting of a lower water-supply tube formed with a small opening or slot in its upper portion and surmounted by a cap provided with spray-holes arranged at a higher level than the said opening or slot.

2. In a jet-tube arrangement, the combination with the jet-tube f of a mud and sand trap a in which the water-current is deflected from its straight course by a deflector-plate c and caused to deposit suspended substances in the tapered lower portion of the said trap from which they can be removed from time to time through a discharge or outlet device.

3. In a jet-tube arrangement, a sand and mud trap characterized by a curved deflector-plate c having holes c' for obtaining a uniform separation of the inflowing current.

4. In a jet-tube arrangement, the combination of a mud and sand trap, means in the latter for deflecting a water-current and causing the latter to deposit suspended substances in the lower portion of said trap, a jet-tube having in its lower portion, a water-supply tube, a slot in the upper portion of the latter, a cap above said slot, and spray-holes in said cap located at a higher level than said slot.

In testimony whereof I have hereunto set my hand, in presence of two subscribing witnesses, this 10th day of November, 1899.

ROBERT DIETRICH.

Witnesses:
RUDOLPH FRICKE,
A. KRAUSS.